United States Patent [19]

Zerpner et al.

[11] 4,086,301
[45] Apr. 25, 1978

[54] HEAT-SEALABLE VULCANIZATES COMPRISING POLYOLEFIN RUBBER AND PROPYLENE POLYMER

[75] Inventors: Dieter Zerpner, Oer-Erkenschwick; Klaus Zur Nedden, Marl; Albert Frese, Marl; Hans Datene, Marl, all of Germany

[73] Assignee: Chemische Werke Huls Aktiengesellschaft, Marl, Germany

[21] Appl. No.: 682,402

[22] Filed: May 3, 1976

[30] Foreign Application Priority Data

May 6, 1975 Germany .............................. 2520095

[51] Int. Cl.$^2$ .............................................. C08L 23/16
[52] U.S. Cl. .............................. 260/897 A; 260/876 B; 260/889; 260/23 H; 260/23.5 R; 260/23.5 A; 260/33.6 AQ; 260/42.33; 260/42.36; 260/42.39; 260/42.42
[58] Field of Search .................... 260/897 A, 33.6 AQ

[56] References Cited

U.S. PATENT DOCUMENTS

| | | | |
|---|---|---|---|
| 3,564,080 | 2/1971 | Pedretti et al. ...................... | 260/897 |
| 3,806,558 | 4/1974 | Fischer ................................. | 260/897 |

*Primary Examiner*—Carman J. Seccuro
*Attorney, Agent, or Firm*—Millen & White

[57] ABSTRACT

Polyolefin rubber compositions which are readily heat-sealable are provided by the addition of 5–100 parts by weight, based on the polyolefin elastomer, of a propylene polymer uniformly admixed therewith prior to vulcanization which is selected from the group consisting of polypropylene and copolymers of propylene with up to 20% by weight of ethylene, butene-1 or hexene-1 which polymer has a heptane-extractable portion of 5–60%, and I-value measured according to DIN 53 728 of 100–600 cm$^3$/g. and a yield point measured according to DIN 53 735 of 10–30 N/mm$^2$.

9 Claims, No Drawings

HEAT-SEALABLE VULCANIZATES COMPRISING POLYOLEFIN RUBBER AND PROPYLENE POLYMER

BACKGROUND OF THE INVENTION

This invention relates to heat-sealable polyolefin elastomer vulcanizates.

Articles of vulcanized polyolefin elastomers are primarily utilized, as is known, in applications where high requirements must be met with respect to resistance against the effects of weathering and aging. Thus, a desirable application in the building industry is, for example, the utilization of sheets of ethylene-propylene copolymers (EPM), ethylenepropylene-diene terpolymers (EPDM) or butyl rubber (BR) as roof covering. In this type of roofing, tightness is largely determined and limited by the rather problematical way of laying the sheets to form seams or overlapping portions. For this reason, several attempts have already been made to join articles of vulcanized polyolefin elastomers with each other or with articles of other materials.

Thus, it has been known from DAS (German Published Application) No. 1,620,832 to conduct a process for the manufacture of a solid adhesive bond between polyethylene and natural or synthetic rubber by vulcanization with the use of heat and pressure, characterized in that polyethylene having a melt index of less than 0.15 is used. The polyethylene is preferably applied in powder form to the surface of the rubber before the exertion of pressure and exposure to heat. However, the polyethylene can also be applied in the form of a film.

It is known from DOS (German Unexamined Laid-Open Application) No. 2,004,379 to establish adhesive bonds between vulcanized layers of elastomeric copolymers and/or terpolymers of ethylene with an α-olefin and a selective polyene and/or butyl rubber, if there is inserted between these elastomeric layers a plastomeric layer of a thermoplastic polymer and/or copolymer of ethylene, propylene and/or butene which is free of substituent groups having a polar character and free of reactive groups, and the thus-combined layers are subjected to the effect of heat, preferably under pressure.

Finally, a process is known from DOS No. 2,322,594 for bonding a molded article of an ethylene/propylene copolymer rubber (EPM) or an ethylene/propylene/diolefin copolymer rubber (EPDM) with a polyolefin resin.

All of the processes and/or measures of the above-discussed state of the art, however, exhibit more or less serious practical deficiencies. For example, it is only possible by means of the process according to DOS No. 2,322,594 to join molded articles of an ethylene/propylene or ethylene/propylene/diene copolymer with an article of a thermoplastic material (synthetic polyolefin resin), but it is impossible thereby to connect molded articles of EPM or EPDM with each other.

The use of pulverulent polyolefin hot-melt adhesives according to DOS No. 1,620,832 has the disadvantage, above all during the sealing of rubber roofing sheets, that the powder frequently does not remain at the point provided for the heat-sealing step due to the inclination of the roof, wind and the heat-sealing device used for the welding step. The use of very thin film strips according to DOS's Nos. 1,620,832 and 2,004,379 is often made difficult for the same reason.

When using film strips of a polyolefin, four surfaces must be heated almost uniformly and must be held in the correct position. A previously conducted strip-shaped coating of the roofing sheets to be glued together at the zones intended for the welding step is possible, but unsatisfactory since additional welds are necessary in view of the deviations from the laying pattern (chimneys, eaves, etc.) unavoidable under practical conditions. When using polyolefin film strips, there is the additional danger that individual droplets are formed during the complete melting of the polyolefin, leading to a non-uniform and thus leaking weld.

OBJECTS OF THE INVENTION

Accordingly, it is a general object of the present invention to provide polyolefin or butyl rubber vulcanizates which overcome the aforementioned deviciencies of the prior art.

Another object of this invention is to provide polyolefin or butyl rubber vulcanizates which are readily heat-sealable at temperatures sufficiently low for practical outdoor use, particularly in the construction industry.

A further object of the present invention is to provide polymer blends suitable for forming the above-mentioned vulcanizates.

Upon study of the specification and appended claims, further objects and advantages of this invention will become apparent to those skilled in the art.

SUMMARY OF THE INVENTION

Briefly, the above and other objects, features and advantages of the present invention are attained in one aspect thereof by providing, in a heat-sealable polyolefin elastomer vulcanizate comprising:
(a) a polyolefin elastomer selected from the group consisting of EP copolymers of ethylene with at least one of propylene and butene-1, EPDM copolymers of ethylene and at least one of propylene and butene-1, with an unconjugated diene, and elastomeric copolymers of isobutylene and isoprene; and
(b) a cross-linking amount of an elastomer cross-linking agent, the improvement which comprises:
5–100 parts by weight, based on said polyolefin elastomer, of a propylene polymer uniformly admixed therewith prior to vulcanization which is selected from the group consisting of polypropylene and copolymers of propylene with up to 20% by weight of ethylene, butene-1, or hexene-1 which polymer has a heptane-extractable portion of 5–60%, an I-value measured according to DIN 53 728 of 100–600 cm$^3$/g. and a yield point measured according to DIN 53 735 of 10–30 N/mm$^2$.

DETAILED DISCUSSION

It has now been found that it is possible to permanently heat-seal vulcanizates on the basis of polyolefin rubbers in a simple manner, namely merely with the use of heat, if they contain the compositions of the present invention.

Within the scope of this invention, vulcanizates of polyolefin elastomers are understood to mean shaped articles, primarily sheets or films, comprising ethylene-propylene and/or butene-1 co- or terpolymers, ethylene-propylene and/or butene-1-unconjugated diene ter- or quaterpolymers or isobutylene-isoprene copolymers.

Preferred polyolefin elastomers useful for preparation of the heat-sealable vulcanizates according to this invention are saturated polyolefin elastomers comprising 15-90% by weight, preferably 30-75% by weight, of ethylene and correspondingly 85-10% by weight, preferably 70-25% by weight, of propylene and/or butene-1. Also preferred are unsaturated polyolefin elastomers comprising, in addition to ethylene, propylene and/or butene-1 within the limits just indicated for the saturated polyolefin elastomers, a multiple olefin in such an amount that the elastomers contain 0.5-30 double bonds per 1000 carbon atoms. Especially preferred multiple olefins are cis- and trans-1,4-hexadiene, dicyclopentadiene, 5-methylene-, 5-ethylidene and 5-isopropylidene-2-norbornene. These polymers can be prepared in accordance with conventional prior-art processes, e.g. as described in DAS's Nos. 1,570,352; 1,595,442; and 1,720,450.

The butyl rubber usable in accordance with this invention can also be produced by conventional techniques, e.g. according to the method of French Patent No. 1,508,766.

The polypropylenes and/or copolymers of propylene with up to 20% by weight of ethylene, butene-1 or hexene, which are specific and essential to this invention, can be readily obtained by the polymerization of propylene, optionally with ethylene and/or butene-1 and/or 1-hexene as the comonomers, with the aid of a mixed titanium-aluminum chloride catalyst of the composition $TiCl_3 \cdot nAlCl_3$ ($n = 0.2-0.6$), which is produced, for example, by the reduction of titanium tetrachloride with metallic aluminum or organoaluminum compounds, and further containing an organoaluminum compound. In particular, a thermally unstable titanium-aluminum chloride in the $\gamma$- or $\delta$-modification is useful which loses, at temperatures of up to 250° C., the largest portion of the aluminum chloride. Catalyst activation is preferably accomplished with dialkyl aluminum halides, especially with dialkyl aluminum chlorides. Below a polymerization temperature of 50° C., it is also possible to use preferably aluminum trialkyls and aluminum dialkyl hydrides. Other suitable halogen-containing organoaluminum compounds are the alkyl aluminum sesquihalides and the alkyl aluminum dihalides, but these are used in combination with electron donors. The chlorides are preferably employed. Mixtures of the various alkyl aluminum compounds are also suitable, e.g. mixtures of aluminum trialkyls with dialkyl aluminum chlorides.

The titanium-trichloride-containing catalysts are preferably used in a concentration of 0.1-10 millimoles/liter of liquid phase and at a molar ratio of Al:Ti of 1-3:1, preferably 1.5-2.5:1.

The polymerization is conducted at temperatures of up to 100° C., preferably 30°-90° C., especially 50°-80° C., in any of the inert hydrocarbon diluents known to be suitable in polymerization with the aid of Ziegler-Natta catalysts, as well as in excess liquid monomers as the diluent. Preferably, the propylene is polymerized in $C_4$-cuts, which contain butene-2 in addition to butane and butene-1. The butene-2 accelerates the polymerization and improves the copolymerization of butene-1 with propylene, as is more particularly described in Federal Republic of German Application DOS No. 2 338 478. Further suitable comonomers are ethylene and hexene-1. The comonomer or comonomers, which may be present in the polymer to an extent of up to 20% by weight, are preferably added together with the propylene, since in this way copolymers having a statistically random distribution of the monomer units, which are considered to be preferred, are obtained.

The polymerization can be conducted continuously and/or discontinuously. For molecular weight regulation purposes, hydrogen can be utilized, as is known.

The polypropylenes and/or copolymers of propylene with up to 20% by weight of ethylene, butene-1 or hexene-1 which are usable in accordance with this invention have a heptane-extractable proportion of 5-60%, preferably 8-45%, an I-value of 100-600 $cm^3$/g., preferably 150-500 $cm^3$/g., especially 200-400 $cm^3$/g., and a yield point of 10-30 $N/mm^2$, preferably 16-28 $N/mm^2$, especially 20-26 $N/mm^2$. They are added to the polyolefin elastomers prior to vulcanization in an amount of 5-100 parts by weight, preferably 15-60 parts by weight, and especially 20-40 parts by weight, based on 100 parts by weight of polyolefin rubber.

Normally, the mixing can be conducted, without needing a separate working step, simultaneously with the incorporation of the additives customary in rubber technology, e.g. by means of a rolling mill or an internal mixer, advantageously at a temperature ranging above the melting point of the polyolefin used and not exceeding 250° C., preferably not exceeding 200° C. Subsequently, the vulcanizing agents are then incorporated at temperatures where the mixture has not yet commenced the vulcanizing reaction.

A particularly suitable vulcanizing agent is sulfur in combination with one or more conventional vulcanization accelerators with the addition of zinc oxide and higher fatty acids, e.g. stearic acid. Peroxides or special sulfur donors, e.g. N,N'-morpholine disulfide or special thiurams, can be used with the same success for cross-linking purposes.

Advantageous additives are the conventional active fillers and plasticizers. Suitable fillers are carbon blacks of all stages of activity, as well as the customarily usable mineral products, e.g. chalk, silicates and highly active silicic acids. The plasticizers employed are the conventional refinery products; oils having primarily aromatic, naphthenic or paraffinic components can be used. Furthermore, all conventional antiaging substances can, of course, also be added.

The subsequent conductance of the cross-linking reaction in presses, autoclaves, etc. does not require any special measures.

The vulcanizates of this invention can be heat-sealed with one another as well as with vulcanizates of other polyolefin elastomers which do not contain the addition of the specific polypropylene or copolymer of propylene within the scope of this invention with up to 20% by weight of ethylene, butene-1 or 1-hexene. Moreover, heat-sealing is likewise possible with specific unvulcanized polyolefin elastomers, namely the so-called sequence or block polymers. These are ethylene-$\alpha$-olefin copolymers and/or ethylene-$\alpha$-olefin-diene terpolymers containing ethylene or one of the $\alpha$-olefins in addition to a statistically random distribution of the monomers in the polymer chain in the form of differently long chain sequences, e.g. as described in Federal Republic of Germany Application DOS No. 2 427 343.

The heat-sealing step, which is generally conducted at the site where the product is used, is accomplished, for example, by heating the vulcanizates to be welded together, e.g. in the form of panels, profiles or sheets at the appropriate locations (free of parting agent), e.g. by means of a hot-air blower, to a temperature above the melting point of the polyolefin utilized; placing the heated parts to be joined one on top of the other, and applying pressure thereon, e.g. with a pressure roll. Suitably, the welded-together parts are maintained under pressure until they have cooled down to room temperature.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight. In all of the Examples, at least two layers are bonded by heat-sealing. However, it will be apparent that basically any desired number of layers can be welded together in an analogous fashion.

The characteristic values indicated in the Examples were measured in accordance with the following methods and DIN (German Industrial Standard) norms, respectively:

| | |
|---|---|
| I-value in cm$^3$/g.: | measured on a 0.1% solution in "Decalin" (decahydronaphthalene) at 135° C. according to DIN 53 728 |
| Heptane-extractable proportion in %: | measured by the weight difference after extraction with boiling heptane |
| Yield point in N/mm$^2$ = MPa (mega-Pascals): | measured according to DIN 53 735 |
| Tear strength in N/mm$^2$: | measured according to DIN 5s 735 |
| Elongation at rupture (ultimate elongation) in %: | measured according to DIN 53 735 |
| Notch impact strength in kJ/m$^2$ (kilo-Joules per square meter): | measured according to DIN 53 453 |
| MFI$_{190/5}$ value in g1/10' (grams per 10 minutes): | measured according to DIN 53 735 |
| Tensile strength in N/mm$^2$: | measured according to DIN 53 504 |
| Elongation at yield in %: | measured according to DIN 53 504 |
| Modulus at 200% elongation in N/mm$^2$: | measured according to DIN 53 504 |
| Tear propagation resistance in N/mm: | measured according to Pohle |
| Hardness at 22° C. in ° Shore A: | measured according to DIN 53 505 |
| Impact elasticity in %: | measured according to DIN 53 512 |
| Resistance to peeling in N/mm: | measured according to DIN 53 274 |

EXAMPLE 1

Production of a Propylene-Butene-1 Copolymer

With the aid of a mixed catalyst made of 0.02 part by weight of a TiCl$_3$ catalyst having the composition TiCl$_3$ . 0.33 AlCl$_3$ (primarily the δ-modification, commercially available aluminum-reduced titanium trichloride) and 0.03 part by weight of diethylaluminum chloride, 20 parts by weight of propylene (99% pure) is polymerized in 50 parts by weight of a butene-2-butene-1-butane mixture of 39.2% trans-butene-2, 19.8% cis-butene-2, 39.8% n-butane, 1.0% butene-1 and 0.2% isobutene at 50° C. after the addition of 0.0002 part by weight of hydrogen under a pressure of 10–7 bars. After a polymerization period of 4 hours, the polymerization is short-stopped by adding 0.1 part by weight of steam. By expanding the suspension through nozzles, 18.5 parts by weight of a powdery propylene-butene-1 copolymer is obtained having the following characteristic values:

| | |
|---|---|
| I-value: | 330 cm$^3$/g. |
| MFI$_{190/5}$: | 3.8 g./10' |

| | |
|---|---|
| Heptane extract: | 11% |
| Yield point: | 22.3 N/mm$^2$ |
| Tear strength: | 31.8 N/mm$^2$ |
| Ultimate elongation: | 758% |
| Notch impact strength: | |
| 20° C. | 24.2 kJ/m$^2$ |
| 0° C. | 10.1 kJ/m$^2$ |
| −20° C. | 5.6 kJ/m$^2$ |

The copolymer was used together with other polypropylenes during the tests reported in Examples 3–8 to investigate the heat-sealability of EPDM rubber vulcanizates.

EXAMPLE 2

Production of a Heat-Sealable Vulcanizate of EPDM Rubber

At a temperature of 180° C., a homogeneous mixture of the following components was prepared on a laboratory rolling mill having a size of 200 × 450 mm. at a friction of 1:1.12:

| | Parts by Weight |
|---|---|
| Ethylene-propylene-5-ethylidene-2-norbornene terpolymer ("BUNA" AP 541) | 100 |
| Polypropylene (I-value: 250 cm$^3$/g.; heptane-extractable proportion: 42.3%; yield point: 20.5 N/mm$^2$) | 40 |
| Stearic acid | 1 |
| Zinc oxide | 5 |
| Carbon black N 550 | 130 |
| Siliceous chalk ("Sillitin" N) | 30 |
| Mineral oil ("Gulf" Oil 2212) | 70 |

After cooling of the mixture, the following vulcanization system was incorporated therein at 50° C.:

| | Parts by Weight |
|---|---|
| Sulfur | 0.6 |
| Tetramethylthiuram monosulide | 0.5 |
| Dibenzothiazyl disulfide | 1.0 |
| Dicyclohexylammonium-O,O'-diisobutyl-dithiophosphate | 1.0 |
| Zinc N-di-n-butyldithiocarbamate | 1.0 |

The thus-obtained mixture was thereafter heated for 10 minutes in a vulcanizing press at 200 bars to 170° C. and pressed in a mold into panels having a thickness of 2 mm. for the heat-sealing tests. The vulcanizate (called vulcanizate A in the following Table 1 and a portion of the subsequent experiments) had the following mechanical properties:

| | |
|---|---|
| Tensile strength | 13.3 N/mm$^2$ |
| Elongation at yield | 440% |
| Modulus at 200% elongation | 8.4 N/mm$^2$ |
| Tear propagation resistance | 3 N/mm. |
| Hardness | 76° Shore A |
| Impact elasticity | 31% |

The vulcanizate did not show any cracks at an elongation of 20%, after being exposed to ozone in a concentration of 200 p.p.m. for 7 days.

COMPARATIVE EXAMPLE 1

Vulcanizate B was produced in accordance with the description of Example 2, the only difference being that the polypropylene of Example 2 was replaced by a commercially available, isotactic polypropylene (I- value 400 cm³/g., practically insoluble in heptane, yield point 33.4 N/mm²).

COMPARATIVE EXAMPLE 2

For producing vulcanizate C, Example 2 was modified in two aspects. First, the roll temperature was lowered from 180° C. to 150° C. Second, rather than using 40 parts by weight of polypropylene, there was used 40 parts by weight of a practically heptane-insoluble low-pressure polyethylene having an I-value of 420 cm³/g.

Test for Heat-Sealability

To test the heat-sealability, strips of vulcanizates A through C, having a length of 150 mm., a width of 30 mm. and a thickness of 2 mm., were heat-sealed in accordance with DIN 53 274. In order to arrive at comparable values, the heat-sealing step was carried out for 5 minutes at 170° C. or 140° C., in a customary vulcanizing press rather than by hand, at 5 bars; thereafter, the specimens were tested for peeling resistance at room temperature (20° C.) or at 70° C. in a customary tearing machine with a diagram writer connected thereto, with a feed rate of 100 mm./min. The peeling resistance of the test resulting from the diagram as an average value plotted over the parting distance is indicated in N/mm. The results can be seen from Table 1.

TABLE 1

| Vulcanizate | A | | B | | C | |
|---|---|---|---|---|---|---|
| Heat-sealing temperature, ° C. | 140 | 170 | 140 | 170 | 140 | 170 |
| Peeling resistance in N/mm. (average value over the parting distance | | | | | | |
| at 22° C. | 4.1 | 4.9 | 0.3 | 2.2 | 1.0 | 2.8 |
| at 70° C. | 1.0 | 2.5 | ca. 0.03 | 0.3 | ca. 0.15 | 0.9 |

EXAMPLES 3–8

With the aid of these Examples, the effect of the change of molecular parameters of the polypropylene and/or the copolymers of propylene usable according to this invention (e.g. heptane extractable proportion, I-value and yield point) and the effect of the amount mixed-in on heat-sealability can be demonstrated.

The vulcanizates were produced according to the method of Example 2; the test was carried out as described for vulcanizates A through C. The results are shown in Table 2.

TABLE 2

| Example | 3 | 4 | 5 | 6 | 7 | 8 |
|---|---|---|---|---|---|---|
| Parts by weight of polypropylene based on 100 parts by weight of EPDM | 20 | 40 | 20 | 40 | 60 | 40 |
| Heptane-extractable proportion (%) | 11 | 11 | 44 | 44 | 44 | 21 |
| I-Value cm³g. | 330 | 330 | 230 | 230 | 230 | 440 |
| Yield point N/mm² | 22.3 | 22.3 | 18.8 | 18.8 | 18.8 | 22.2 |
| Peeling resistance N/mm (average value over parting distance) | | | | | | |
| at 22° C. | 3.4 | 4.2 | 5.8 | 5.2 | 4.7 | 4.6 |
| at 70° C. | 1.5 | 1.9 | 2.6 | 2.0 | 1.7 | 1.5 |

EXAMPLE 9

At a roll temperature of 180° C., 100 parts by weight of a saturated ethylene-propylene rubber (49% ethylene, 51% propylene, Mooney viscosity 40) and 40 parts by weight of the polypropylene according to Example 5 were homogeneously mixed. After cooling of the mixture, the following substances were incorporated at a roll temperature of 50° C.:

| Zinc oxide | 7.5 | parts by weight |
|---|---|---|
| Carbon black N 774 | 65 | " |
| Mercaptobenzimidazole | 1 | " |
| 1,3-bis(tert.-butyl-peroxyisopropyl)benzene | 3 | " |
| Triallyl cyanurate | 1 | " |

The thus-obtained mixture was heated for 20 minutes in a vulcanizing press at 200 bars to 170° C. and pressed into panels having a thickness of 2 mm. for testing heat-sealability. The thus-produced vulcanizate had the following mechanical properties:

| Tensile strength | 11.8 N/mm² |
|---|---|
| Elongation at yield | 351% |
| Modulus at 200% elongation | 8.1 N/mm² |
| Tear propagation resistance | 25 N/mm. |
| Hardness at 22° C. | 73° Shore A |
| Impact elasticity | 42% |

The heat-sealing and testing for peeling resistance in connection with these vulcanizates took place as described for vulcanizates A through C. The results are set forth in Table 3.

EXAMPLE 10

At a roll temperature of 180° C., 100 parts by weight of butyl rubber ("Enjay Butyl" 365 of Exxon) and 40 parts by weight of polypropylene of the type indicated in Example 5 were mixed homogeneously. After cooling, the following vulcanizing agents and additives were furthermore incorporated at a roll temperature of 40° C.:

| Chalk | 70 | parts by weight |
|---|---|---|
| Carbon black N 550 | 50 | " |
| Silicate filler (70% SiO₂) | 15 | " |
| Ozocerite (hydrocarbon wax) | 5 | " |
| Magnesia usta, light | 5 | " |
| Stearic acid | 1.5 | " |
| Zinc oxide | 5 | " |
| Sulfur | 1.25 | " |
| Tetramethylthiuram disulfide | 1.5 | " |
| 2-Mercaptobenzothiazole | 2.0 | " |
| N,N'-Morpholine disulfide | 1.25 | " |

The thus-obtained mixture was heated for 20 minutes in a vulcanizing press at 200 bars to 150° C. and pressed into panels having a thickness of 2 mm. in order to test heat-sealability. The thus-produced vulcanizate had the following mechanical properties:

| Tensile strength | 82 N/mm² |
|---|---|
| Elongation at yield | 350% |
| Modulus at 200% elongation | 64 N/mm² |
| Tear propagation resistance | 18 N/mm. |
| Hardness at 22° C. | 85° Shore A |
| Impact elasticity | 14% |

The heat-sealing step and the test for peeling resistance were carried out as described for vulcanizates A through C. The results are shown in Table 3.

EXAMPLE 11

Vulcanizate A was heat-sealed to a vulcanizate which did not contain the addition of polypropylene according to this invention and which had the composition set forth below, in accordance with the description for vulcanizates A through C:

| | | |
|---|---|---|
| Ethylene-propylene-5-ethylidene-2-norbornene terpolymer ("BUNA" AP 541) | 100 | parts by weight |
| Stearic acid | 1 | " |
| Zinc oxide | 5 | " |
| Carbon black N 330 | 50 | " |
| Mineral oil ("Gulf" Oil 2212) | 10 | " |
| Tetramethylthiuram disulfide | 1 | parts by weight |
| 2-mercaptobenzothiazole | 0.5 | " |
| Sulfur | 1 | " |

The heat-sealing step and the test for peeling resistance were carried out as indicated for vulcanizates A through C. The results are shown in Table 3.

EXAMPLE 12

Strips of the vulcanizate A were heat-sealed by means of a hot-air device having a nozzle of a width of 30 mm. at a hot-air temperature of about 300° C. for approximately 1 minute while applying pressure with a rubber roller. The peeling resistance was tested as described in detail in connection with vulcanizates A through C. The results are set forth in Table 3.

TABLE 3

| Example | 9 | 10 | 11 | 12 |
|---|---|---|---|---|
| Heat-Sealing Conditions | 5' at 170° C. | 5' at 170° C. | 5' at 170° C. | 1' at about 300° C. |
| | 5 bars | 5 bars | 5 bars | Rubber Roller |
| Peeling Resistance N/mm. (Average Value over the Parting Distance) | | | | |
| at 22° C. | 7.0 | 4.6 | 4.6 | 4.8 |
| at 70° C. | 3.6 | 1.2 | 1.4 | 1.7 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a heat-sealable polyolefin elastomer vulcanizate comprising:
   (a) a polyolefin elastomer selected from the group consisting of EP copolymers of ethylene with at least one of propylene and butene-1, and EPDM copolymers of ethylene and at least one of propylene and butene-1 with an unconjugated diene, and
   (b) a cross-linking amount of an elastomer cross-linking agent, the improvement which comprises:
   5–100 parts by weight, based on said polyolefin elastomer, of a propylene polymer uniformly admixed therewith prior to vulcanization which is selected from the group consisting of polypropylene and copolymers of propylene with up to 20% by weight of ethylene, butene-1 or hexene-1 which polymer has a heptane-extractable portion of 5–60%, and I-value measured according to DIN 53 728 of 100–600 cm$^3$/g. and a yield point measured according to DIN 53 735 of 10–30 N/mm$^2$.

2. A vulcanizate according to claim 1 wherein said propylene polymer has a heptane-extractable proportion of 8–45%.

3. A vulcanizate according to claim 1 wherein said propylene polymer has an I-value of 150–500 cm$^3$/g.

4. A vulcanizate according to claim 1 wherein said propylene polymer has a yield point of 16–28 N/mm$^2$.

5. A vulcanizate according to claim 1 further comprising a plasticizing amount of a plasticizer oil and a strengthening amount of an elastomer filler.

6. A vulcanizate according to claim 5 wherein said cross-linking agent comprises sulfur in combination with a vulcanization accelerator, zinc oxide and stearic acid.

7. A vulcanizate according to claim 1 wherein the polyolefin elastomer is a copolymer of ethylene and propylene.

8. A vulcanizate according to claim 1 wherein the polyolefin elastomer is an EPDM terpolymer.

9. The vulcanizate according to claim 8 wherein the unconjugated diene is 1,4-hexadiene, dicyclopentadiene, 5-methylene-, 5-ethylidene- or 5-isopropylidene-2-norbornene.

* * * * *